No. 768,201. PATENTED AUG. 23, 1904.
M. M. SUPPES.
LEADING SPINDLE AND COUPLING FOR ROLLING MILLS.
APPLICATION FILED JULY 15, 1903.
NO MODEL.

WITNESSES:
A. T. A. B. McCauley
Loretto O'Connell

INVENTOR
M. M. Suppes
BY
Geo. H. Parmelee,
his ATTORNEY.

No. 768,201. Patented August 23, 1904.

UNITED STATES PATENT OFFICE.

MAXIMILIAN M. SUPPES, OF ELYRIA, OHIO.

LEADING-SPINDLE AND COUPLING FOR ROLLING-MILLS.

SPECIFICATION forming part of Letters Patent No. 768,201, dated August 23, 1904.

Application filed July 15, 1903. Serial No. 165,676. (No model.)

*To all whom it may concern:*

Be it known that I, MAXIMILIAN M. SUPPES, of Elyria, in the county of Lorain and State of Ohio, have invented a new and useful Improvement in Leading-Spindles and Couplings for Rolling-Mills, of which the following is a full, clear, and exact description, reference being had to the accompanying drawings, which form a part of this specification.

My invention has relation to leading-spindles and couplings for rolling-mills, and is designed to provide a spindle and couplings therefor so constructed and arranged as to greatly reduce the danger of serious injury to the mill and its engine by reason of breakage of the spindle and also to provide a strong, efficient, and simple construction and arrangement of parts.

Leading-spindles sometimes give way in service under the severe strains to which they are subject, notwithstanding care in their design and construction, and the fracture is frequently of such a nature that the impingement of the broken ends upon each other or upon the central support or bearing usually employed to carry the spindle causes the driving-shaft to be pushed endwise or lifted, or both, in such a manner as to more or less completely wreck the engine and mill. My invention is designed to reduce the danger of accidents of this character by so constructing the spindle and couplings as to obviate the necessity of the central bearing or support and also by providing means whereby in case of a fracture of the spindle one of the broken ends may move endwise, and thus clear itself from the other part of the spindle.

With these objects in view my invention consists in the novel construction and combination of parts, all substantially as hereinafter described, and pointed out in the appended claims, reference being had to the accompanying drawings, in which—

Figure 1:
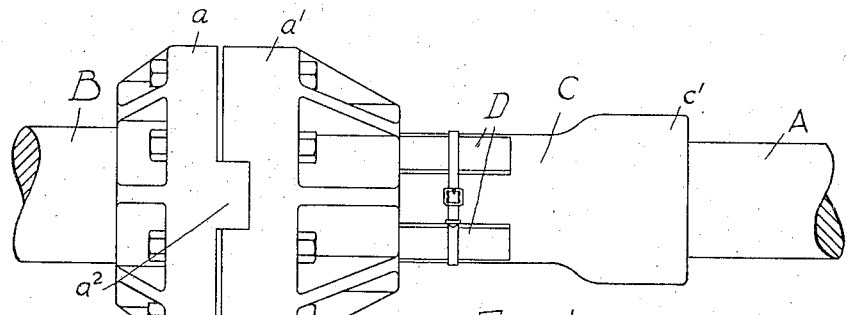
Figure 2:
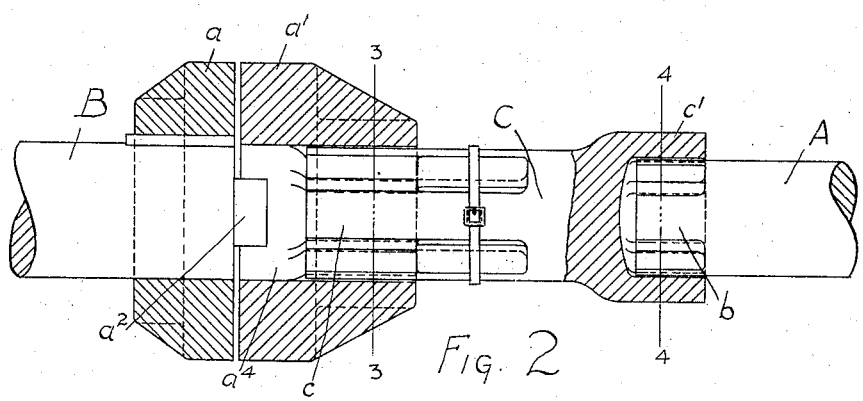
Figure 3:
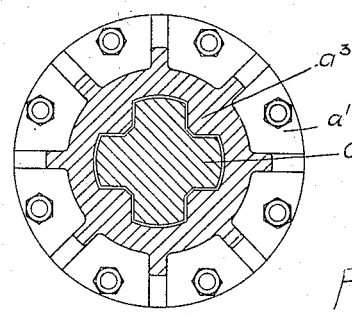
Figure 4:
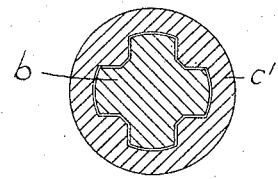

Figure 1 is a side elevation of a leading-spindle and coupling embodying my invention; Fig. 2, a view of the same, partly in longitudinal section; Fig. 3, a section on the line 3 3 of Fig. 2, and Fig. 4 a section on the line 4 4 of Fig. 2.

The letter A designates a driven shaft or gudgeon; B, a driving-shaft or gudgeon; C, a leading-spindle, and $a$ $a'$ a crab or coupling for connecting said spindle to the shaft B. The member $a$ of this coupling is rigidly secured to the shaft or gudgeon B and is detachably connected to the opposing member $a'$, which it also engages by means of lugs $a^2$. The coupling member $a'$ is internally ribbed or fluted, as at $a^3$, to receive the fluted end portion $c$ of the spindle C. The flutes $c$ extend back some distance on the spindle and form seats for stretchers D, which normally hold the spindle from moving endwise into the clearance-space $a^4$ in the coupling member $a'$. The opposite end portion of the spindle C is enlarged at $c'$ and is cored out to receive the fluted end or wabbler $b$ of the shaft A. The clearance-space at $a^4$ is made long enough to permit the spindle to be moved back therein a sufficient distance to clear the wabbler $b$ of the shaft A, so that by disconnecting the coupling member $a'$ from the member $a$ the spindle can be readily removed.

By forming the spindle C with the coupling portion $c'$ I obviate the necessity for the use of separate coupling-pieces for this end of the spindle, and by obviating this coupling I reduce very largely wabbling or weaving movement of the spindle. This enables me to also do away with the central bearing which has usually been employed for the leading-spindle and which is a source of danger when a fracture of the spindle occurs. The stretchers D normally hold the spindle against undue endwise movement; but if a fracture occurs in the spindle at any point within their length the broken portion of the spindle at the driven end will be readily pushed back into the coupling member $a'$ out of the path of the other broken portion, which can revolve freely until the engine is stopped.

I do not wish to limit myself to the precise construction and arrangement of parts which I have herein shown and described, as changes may be made in the details thereof without departing from my invention.

Having thus described my invention, what I claim as new, and desire to secure by Letters Patent, is—

1. In a rolling-mill, driving mechanism, the combination of a driving-shaft or gudgeon, a driven shaft or gudgeon, a coupling rigidly secured to the driving-shaft or gudgeon, a leading-spindle having an exteriorly-fluted portion entering the said coupling and engaging interior flutes thereof, said coupling also having a clearance-space to permit abnormal endwise movement of the spindle, said spindle also having an interiorly-fluted portion engaging a fluted portion of the driven shaft or gudgeon, and stretchers seated in the exteriorly-fluted portion of said spindle and having an end bearing against said coupling at one end and against the spindle at the opposite end.

2. The combination of a driving-shaft or gudgeon, a coupling rigidly secured thereto, a driven shaft or gudgeon, a leading-spindle coupled to said driven shaft or gudgeon and engaging said coupling, and stretchers seated in said spindle and bearing at one end against a shoulder or abutment thereof and at the other end against said coupling.

In testimony whereof I have affixed my signature in presence of two witnesses.

MAXIMILIAN M. SUPPES.

Witnesses:
   F. W. WATERMAN,
   D. W. LAWRENCE.